J. W. SIBBET.
Thill-Coupling.

No. 22,314.

Patented Dec. 14, 1858.

Witnesses:
Thos. J. Bray

Inventor
John W. Sibbet

UNITED STATES PATENT OFFICE.

JOHN W. SIBBET, OF CINCINNATI, OHIO.

ATTACHING CARRIAGE-THILLS TO AXLES.

Specification of Letters Patent No. 22,314, dated December 14, 1858.

*To all whom it may concern:*

Be it known that I, JOHN W. SIBBET, of Cincinnati, in the county of Hamilton and State of Ohio, have invented a new and Improved Mode of Attaching Thills to the Axles of Vehicles; and I do hereby declare that the following is a full, clear, and exact description of the same, reference being had to the annexed drawings, making a part of this specification, in which—

Figure 1:
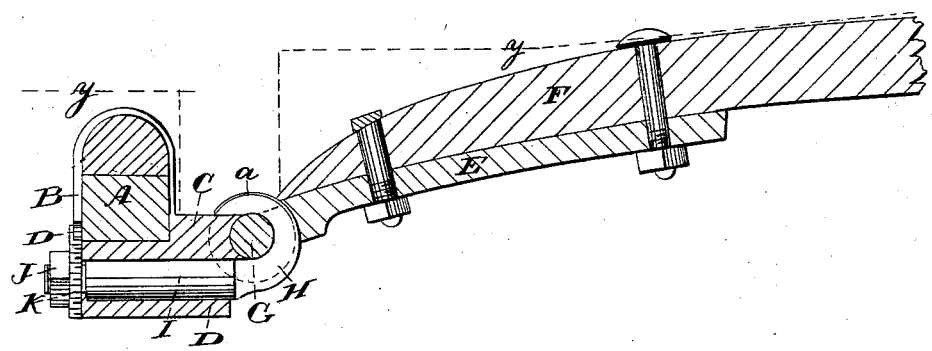
Figure 2:
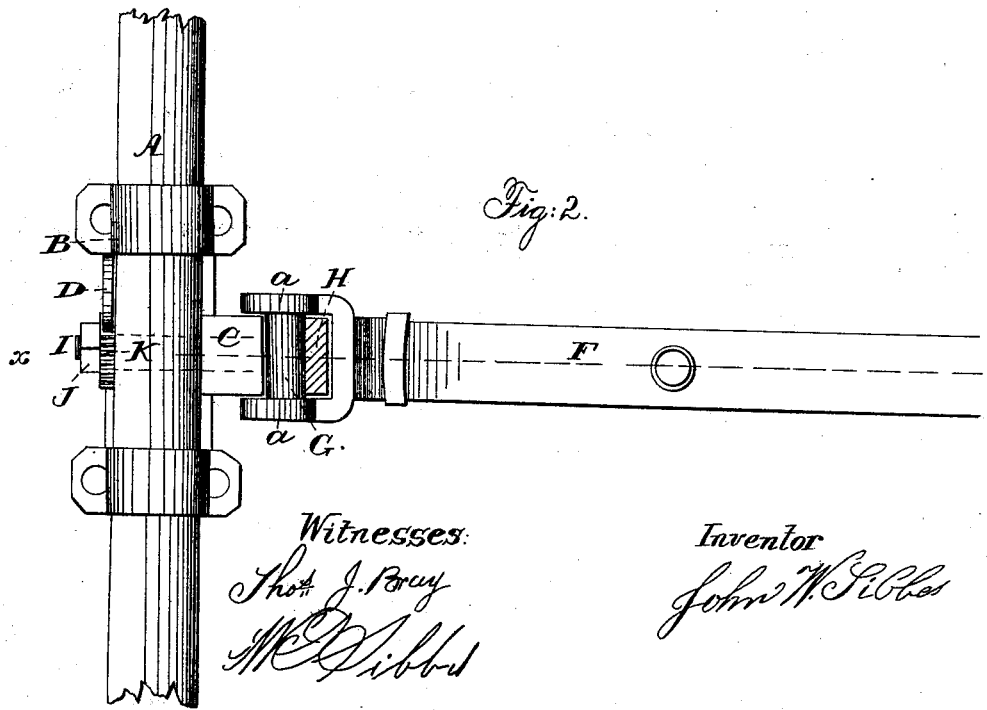

Figure 1, is a longitudinal vertical section of my invention taken in the line $x$, $x$, Fig. 2. Fig. 2, is a plan or top view of the same, the upper portion of the hook being bisected as indicated by the line $y$, $y$.

Similar letters of reference indicate corresponding parts in the two figures.

This invention consists in having the shanks of hooks, which encompass pins attached to the inner ends of the thills, pass through sockets attached transversely to clips which encompass the axle. The ends of the shanks of the hooks have screw threads formed on them on which nuts are fitted, the nuts being attached to ratchets into which pawls secured to the back side of the clips catch and prevent the casual turning and unscrewing of the nuts.

The invention is designed to effectually obviate the rattling and play occasioned by the wear of the parts forming the connection or attachment, by affording a very facile way of taking up the wear or adjusting the connecting hooks as hereinafter described.

To enable those skilled in the art to fully understand and construct my invention I will proceed to describe it.

A, represents the front axle of a vehicle and B, is a clip which encompasses the same. To the bottom plate of the clip at its front edge a plate C, projects at right angles, the front edge of said plate being made concave as shown clearly in Fig. 1. Directly below the plate C, there is a socket or tube D, which has a transverse position relatively with the axle as shown clearly in Fig. 1, said tube extending nearly to the front edge of the plate C, and extending back "flush" with the back edge of the bottom plate of the clip.

The socket or tube D, plate C, and the bottom plate of the clip may all be formed or cast in one piece.

E, is a metal plate which is attached to the under side of the thill F, at its inner end. The plate E, projects a trifle beyond the end of the thill F, and has an ear $a$, attached to each side of it, and between the ears $a$, $a$, a pin G, is secured. The width of the space between the ears $a$, $a$, is equal to the width of the plate C, which is attached to the clip B, as shown clearly in Fig. 2.

H, is a hook, which, forms rather more than a semi-circle and is equal in width to the plate C, and the space between the ears $a$, $a$, see Fig. 2. The hook H, is formed on the end of a cylindrical shank I, which is fitted in the socket or tube D, extends entirely through it and projecting a short distance beyond, said shank having a screw thread cut on it, on which a nut J, is fitted. To the inner side of the nut J, a ratchet K, is attached and a pawl L, which is attached to the back side of the clip catches into the ratchet and prevents the casual turning of the nut J.

The thill is secured to the axle by placing the hook H, around the pin G, and placing the shank I, of the hook in the socket or tube D, the nut J, being fitted on the end of the shank and screwed up until the pin G, is pressed into the concave edge of the plate C, and snugly fitted between said plate and the hook. The thill is thus firmly secured to the axle and in case of wear of the pin, hook or plate C, the nut J, merely requires to be screwed up in order to cause the hook to be adjusted nearer the concave edge of the plate C. To detach the thill the nut J, is unscrewed from the shank I, and the latter withdrawn from the socket or tube.

It will of course be understood that although only one clip and connection is herein shown and described that both thills of a vehicle are secured to the axle in precisely the same way.

Having thus described my invention what I claim as new and desire to secure by Letters Patent, is,

The plate C, and socket or tube D, attached to the clip B, in connection with the pin G, attached to the thill F, and the hook H, provided with a shank I, nut J, and ratchet K, the shank of the hook being fitted in the tube D, and the ratchet having a pawl L, catching into or engaged with it, the whole being arranged substantially as and for the purpose set forth.

JOHN W. SIBBET.

Witnesses:
THOS. J. BRAY,
M. S. SIBBET.